April 25, 1950 M. L. LEVY 2,505,555
MECHANICAL AND ELECTRICAL DUAL
STEERING SYSTEM FOR RUDDERS
Filed May 21, 1945 2 Sheets-Sheet 1

MILTON L. LEVY, INVENTOR.

BY
Mason Fenwick & Lawrence
ATTORNEYS

April 25, 1950
M. L. LEVY
2,505,555
MECHANICAL AND ELECTRICAL DUAL
STEERING SYSTEM FOR RUDDERS
Filed May 21, 1945
2 Sheets-Sheet 2
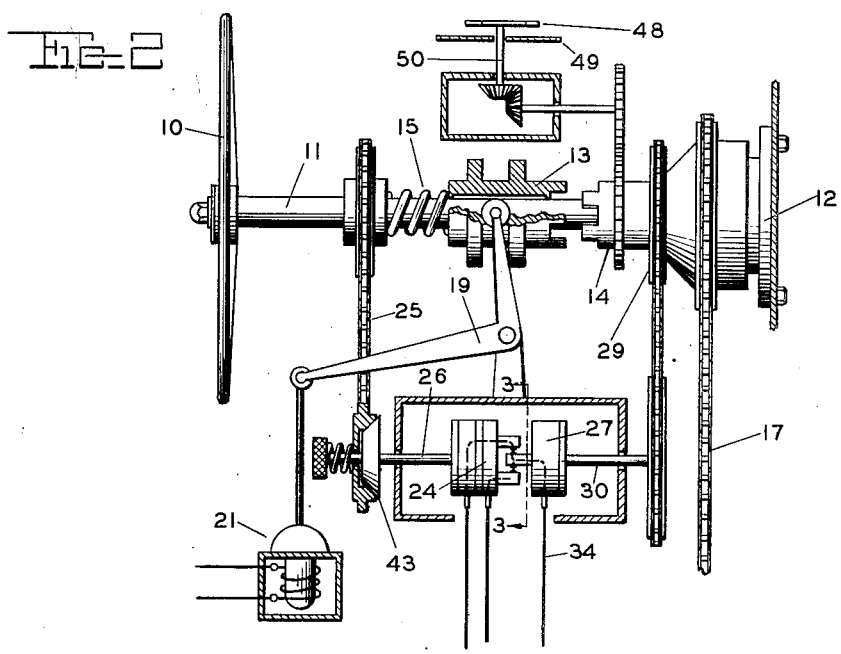
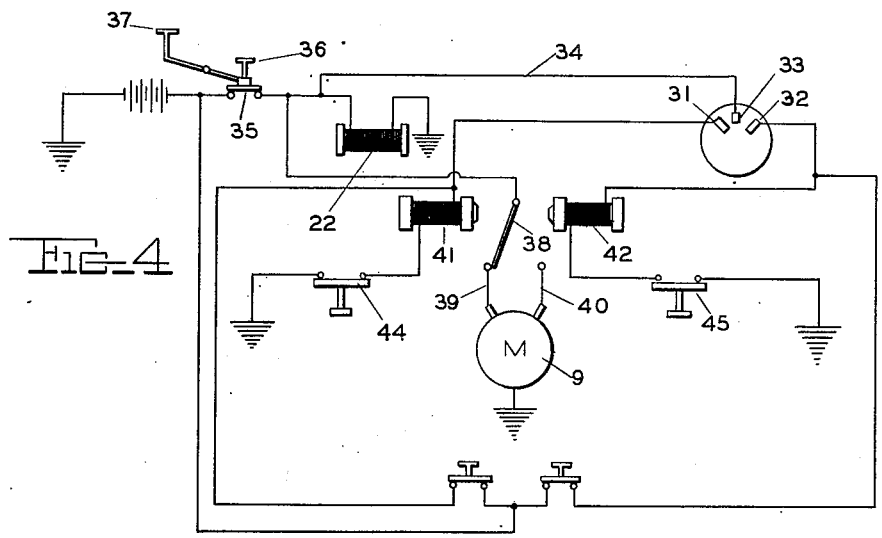
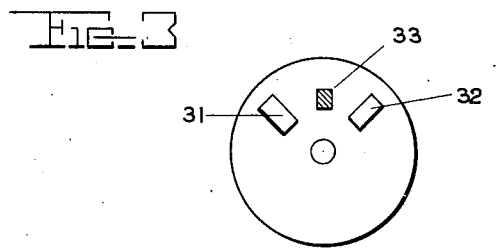
MILTON L. LEVY  INVENTOR.
BY
Mason Fenwick + Lawrence
ATTORNEYS Patented Apr. 25, 1950

2,505,555

UNITED STATES PATENT OFFICE 2,505,555

MECHANICAL AND ELECTRICAL DUAL STEERING SYSTEM FOR RUDDERS

Milton L. Levy, New Orleans, La., assignor to Higgins Industries, Inc., New Orleans, La., a corporation of Louisiana Application May 21, 1945, Serial No. 594,896

7 Claims. (Cl. 318—2)

This invention relates to a dual steering system for boats, which provides a selective manual and electric operation of the rudder. The electric control relieves the steersman of the burden of the rudder load, and also affords facility for the provision of one or more steering control stations at points remote from the steering wheel. This is an extremely useful feature for towboat navigation as practiced, for example, on South American rivers such as the Orinoco, where it is customary in inland transportation work to tow a barge by pushing it, rather than by pulling it, as is the custom at sea.

Such barges are usually loaded two or three tiers high with gasoline drums, crates and other merchandise, with the result that local river pilots must stand on top of the barge's cargo and signal the steersman in the motorboat pushing the barge, either by hand signals or the spoken word. Rocks, rapids and shoals are to be avoided, and the pilot must guide the boat through narrow treacherous shallows and swift river currents. Any misunderstanding between pilot and helmsman might mean disaster.

The electric control permits a flexible electric cable to be passed from the motorboat to the pilot on the barge, with port and starboard push buttons, by means of which the pilot may assume direct control of the steering in precarious situations.

One of the objects of the invention is to provide a selective mechanical and electric steering system, in which the rudder is operated directly by an electric motor, and alternatively, directly through a mechanical train that includes the armature shaft of the electric motor.

Another object of the invention is to operate the rudder either electrically by the motor, or mechanically through the armature shaft of the motor, both phases of operation being effected by the manual turning of a common steering wheel, there being a clutch connection in the mechanical train between steering wheel and armature shaft, and a switch connection between the steering wheel and electric motor, with means adjunctive to the steering wheel for simultaneously declutching the steering wheel from the mechanical train, and activating the switch, thereby shifting the steering wheel from the mechanical to the electric phase of operation.

A further object of the invention is to provide a steering system as described, in which the phase of operation automatically changes from electrical to mechanical, without interruption in the steering function, if for any reason the electrical system becomes inoperative.

Still another object of the invention is the provision of a switch between the steering wheel and electric motor, having a member connected to the steering wheel rotatable in either direction corresponding to the direction in which the steering wheel is turned, and carrying spaced port and starboard contacts, and a member rotated by the motor, carrying a contact positioned between said spaced contacts, the motor being started by the engagement of either of the spaced contacts with the intermediate contact, to run in reverse directions, rotation of the motor causing the intermediate contact to move away from the contact which engaged it, steering being accomplished by turning the steering wheel to keep the contacts together and the motor circuit closed. When the steering wheel is stopped the intermediate contact moves away from the contact which engaged it, and the motor circuit is broken.

Another object of the invention is to provide a slipping clutch between the steering wheel and the member of the control switch operated thereby, so that rapid turning of the steering wheel or turning it through an amplitude which exceeds that necessary to maintain good contact between the switch members is absorbed in slippage in the clutch and does not affect the switch.

Still another object of the invention is to provide remote control electrical steering means for by-passing the steering wheel and steering wheel operated switch, for directly closing the motor circuit for either direction of operation, and holding it closed for the desired steering duration.

Other objects of the invention will appear as the following description of a preferred and practical embodiment thereof proceeds.

In the drawings which accompany and form a part of the following specification:

Figure 2 is a vertical section through a portion of the system, including the motor drive;

Figure 3 is a diametrical section of the control switch, taken along the line 3—3 of Figure 2;

Figure 4 is the wiring diagram.

Figure 1:
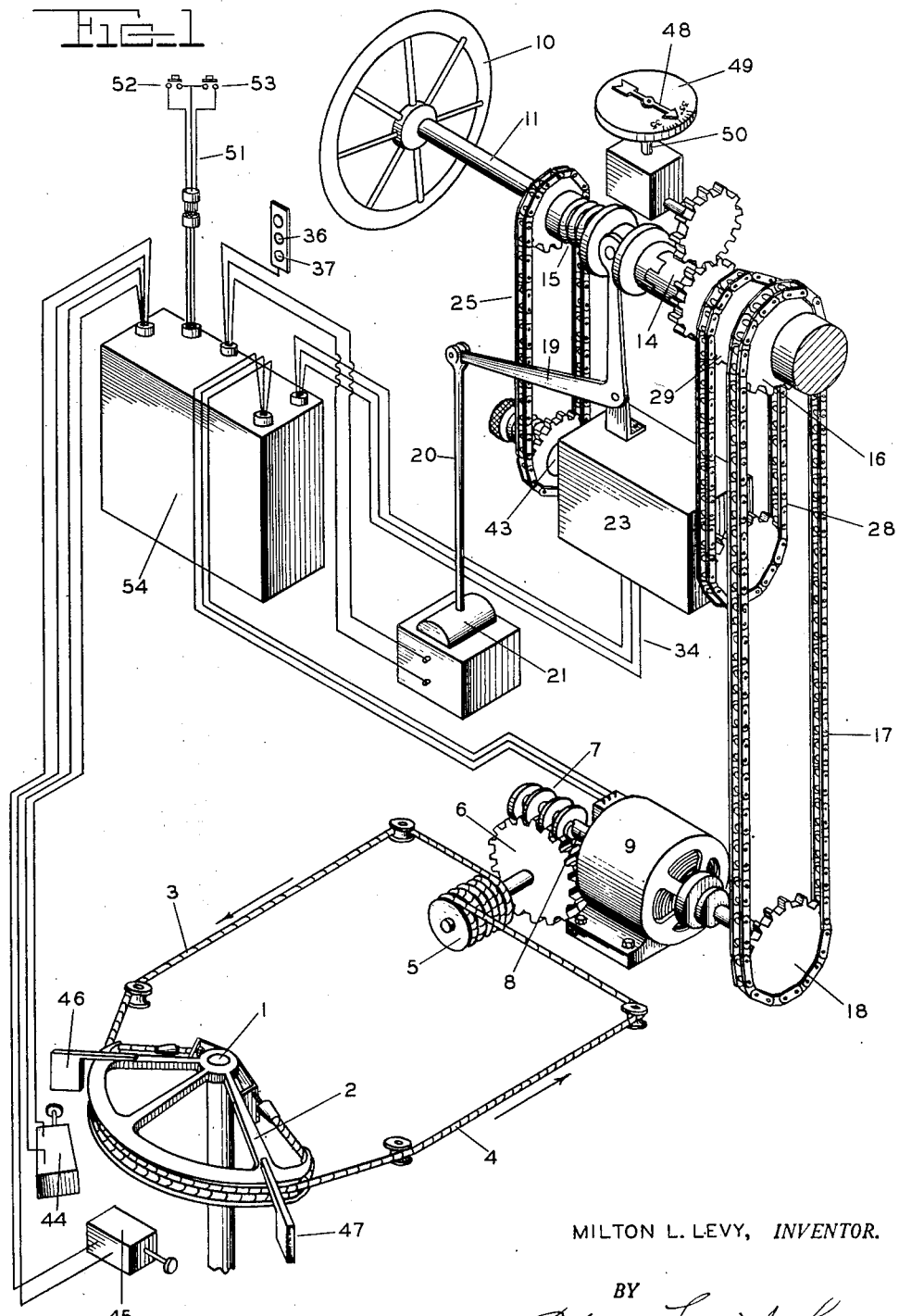
Figure 1 is a diagrammatic perspective view of the dual steering system.

Referring now in detail to the several figures, the numeral 1 represents the rudder post, to which is secured the conventional sector 2, to which the port and starboard steering cables 3 and 4 are secured and about the periphery of which they pass in opposite directions, leading to a drum 5, about which they are oppositely wound. The drum 5 is at the end of a shaft carrying a gear 6, which meshes with a worm 7 at the end of the armature shaft 8 of an electric motor 9. The gear and worm relation is irreversible, so that movements of the rudder induced by the waves or currents are not communicated to the armature shaft. In other words, the rudder is locked in any position to which it is moved, by the steering mechanism. When the steering is done electrically, the electric motor drives the armature shaft. When the steering is done mechanically, the steering force is transmitted through the armature shaft. Thus, the armature shaft is involved both in the electric and mechanical phases of the steering system.

Both the electric and mechanical steering is controlled manually by means of the steering wheel 10. This turns a shaft 11, the remote end of which is journaled in a fixed support 12. A driving clutch member 13 is splined on the shaft 11, and consequently turns when the steering wheel is turned. A driven clutch member 14 is journaled on the remote portion of the shaft 11 and on the fixed support 12. When the steering system is in its mechanical phase, the driving clutch member 13 is forced into mesh with the driven clutch member 14, by means of a spring 15. The driven clutch member 14 carries a sprocket 16, engaged by a chain 17, which passes over a sprocket 18, on the armature shaft 8.

The entire train of force transmission for mechanical steering has now been described. When the steering wheel is turned, it turns the armature shaft, which rotates the gear 6 and drum 5. The arrangement is such that the rudder turns in the direction in which the steering wheel is turned.

For electrical steering, the clutch member 13 is thrown into position of disengagement by means of a bell-crank 19, operated by a rod 20, connected to the armature 21 of a solenoid 22. The clutch connection constituted by the clutch members 13 and 14, is supplanted by a switch connection, as a whole designated by the reference character 23. This comprises a member 24 turning with the steering wheel through a chain 25, which passes over sprockets respectively on the shaft 11 and the switch shaft 26, and a member 27 connected indirectly to the armature shaft by a chain 28, which passes over a sprocket 29 on the driven clutch member 14 and a sprocket on the switch shaft 30. Since the sprockets 16 and 29 are both on the clutch member 14, there is a positive driving train from the armature shaft through the chain 17, chain 28 to the switch member 27.

Referring to Figure 3, it will be noted that the steering wheel driven switch member 23 carries spaced port and starboard contacts 31 and 32, and that the armature driven switch member 27 carries a contact 33 intermediate the port and starboard contacts 31 and 32.

Referring now to Figure 4, it will be noted that the intermediate contact 33 is in a dead circuit wire 34, the circuit being normally broken at the gap 35. A switch represented by the push buttons 36 and 37, controls this gap, as well as the circuit through the solenoid 22. When the push button 36 is pressed, it closes the gap 35, energizing the solenoid 22, and bringing current to the intermediate contact 33. Energization of the solenoid 22 disengages the clutch member 13.

Now, the steering system is in its electrical phase. When the steering wheel is turned in a port or starboard direction, either the port or starboard contact 31 or 32 will engage the intermediate contact 33, closing the motor circuit, and the electric motor 9 begins to operate. If the port contact closed the circuit, then the motor will turn in a direction to deflect the rudder to port, while if the starboard contact 32 was involved in the closing of the motor circuit, the motor will turn in a direction to deflect the rudder to starboard.

The manner in which the direction of rotation of the motor 9 is reversed is shown in Figure 4, in which a switch armature 38 is provided to alternatively energize the forward winding 39, or the reverse winding 40 of the motor. Solenoids 41 and 42 are positioned at opposite sides of the switch armature 38. When the motor circuit is closed by the port contact 31, the current travels from battery to intermediate contact 33, port contact 31, solenoid 41 and back to battery. Energization of the solenoid 41 draws the switch armature 38 into contact with the forward speed motor winding 39. When the starboard contact 32 closes the motor circuit, the solenoid 42 is energized, drawing the switch armature 38 into contact with the reverse motor winding 40.

Now, as soon as the motor circuit is closed, the motor begins to rotate the intermediate contact 33 and tends to break the motor circuit by moving away from either of the contacts 31 or 32 with which it was engaged. The steersman must therefore turn the steering wheel, and with it, the switch member 24 carrying the contacts 31 and 32, in order to keep one of these contacts in engagement with the intermediate contact 33. For example, if the steersman wishes to steer to port, he turns the steering wheel to port. This brings the port contact 31 into engagement with the intermediate contact 33, and starts the motor. The motor in turn begins to rotate the intermediate contact 33 in a port direction. The steersman continues to turn the steering wheel to keep the port contact 31 in engagement with the intermediate contact 33, so long as he wishes to steer to port. When he stops the steering wheel, the continued rotation of the motor separates the contact 33 from the port contact 31; the motor circuit is broken, and the motor stops. This means that the motor will turn the rudder to port when the steering wheel is being turned port, and that the motor will stop turning the rudder to port when the steering wheel is stopped being turned port. This same procedure applies to the starboard direction.

Any desired speed of travel of the rudder can be obtained by using different speed motors or different ratios of power transmission equipment.

A friction clutch 43 is provided between the chain drive 25 and the control switch shaft 26, with enough friction to hold the contacts 31 or 32 in firm engagement with the intermediate contact 33, so long as the steering wheel is being turned. It is constructed to slip, upon any further applied pressure from the steering wheel. Therefore, the steering wheel can be turned over fast without straining or damaging the switch contacts.

Port and starboard limit switches 44 and 45 are provided which are normally closed and set to open when the rudder is turned to its maximum permissible angle. These limit switches are in series circuit with the solenoids 41 and 42 which close the motor circuit, so that when the limit of permissible angular movement of the rudder is reached in either direction, the corresponding solenoid 41 or 42 is de-energized and the motor circuit opened. The motor then may be operated only in the opposite direction. This means that if the steering wheel is turned over to port until the motor stops, the rudder is at its maximum port deflection, and that the rudder can be made to turn back only by turning the steering wheel to starboard. The limit switches 44 and 45 are positioned adjacent the sector 2 and are actuated by respective arms 46 and 47 which project from said sector, and are movable therewith.

One of the virtues of the dual steering system as described is that if while it is being operated electrically anything goes wrong with the electrical circuits, the system automatically changes over from the electrical to mechanical phase of operation, without interrupting the steering function. Should the electrical circuits fail, the solenoid 22 becomes de-energized, permitting the clutch member 13 to engage the clutch member 14 under the bias of the spring 15. The steersman is conscious of the change only through the increased load which he is called upon to assume in turning the steering wheel.

As a matter of convenience, an indicator is positioned adjacent the steersman's station, showing the angular deflection of the rudder at any time. This indicator, as shown, comprises an index 48, mounted to rotate concentrically of an angular scale table 49. The index 48 is mounted at the end of a shaft 50, gear connected to the driven clutch member 14, so that it operates both for the mechanical and electrical phase.

In the event that the steersman wishes to change from the electrical to mechanical phase of steering, he merely pushes the button 37, which opens the gap 35, breaking the circuit to the intermediate contact 31, and at the same time de-energizing whichever of the solenoids 41 and 42 was at the time in operation.

The motor 9 may also be controlled from one or more push button stations, one of which is shown, located in any convenient place for steering the vessel. In Figure 1, a flexible cable 51 is shown, carrying circuits direct to the respective solenoids 41 and 42, and which by-pass the control switch 23. Each of these circuits is controlled by the respective port and starboard push buttons 52 and 53. The flexible cable may extend to the barge being towed, so that the pilot on said barge can assume the steering of the towing boat, when desired. Figure 1 shows a cabinet 54, in which the solenoids 41 and 42 and other of the electrical instrumentalities may be housed.

While I have in the above description disclosed what I believe to be a preferred and practical embodiment of the invention, it will be understood that the specific details and arrangement of parts as shown and described are by way of illustration and not to be construed as limiting the scope of the invention.

What I claim as my invention is:

1. In an electrical steering system for boats, a reversible electric motor having its armature shaft permanently mechanically connected to a rudder, a steering wheel and a control switch, the latter comprising a member mechanically connected to said steering wheel so as to move responsive to port and starboard movements thereof, and having spaced port and starboard contacts in respective circuits which control the operation of the motor in forward and reverse directions, said control switch including a member mechanically connected to the armature shaft to move responsive to the rotation of the armature shaft in either direction and having a contact in circuit with an electrical source, positioned between said port and starboard contacts to be engaged by either to effect the closure of corresponding motor circuits, and a slipping clutch intercalated in the connection between said steering wheel and first mentioned control switch member whereby speed of movement of the steering wheel in excess of speed of movement of said control switch members when the port or starboard contact of the one is engaged with the contact of the other, will be absorbed as lost motion in said clutch.

2. Dual mechanical and electrical steering system comprising a reversible electric motor including an armature shaft, a permanent mechanical connection from said armature shaft to a rudder, a mechanical connection from said steering wheel to said armature shaft including a clutch, an electrical connection from said steering wheel to said motor including a control switch, the latter comprising a member mechanically connected to said steering wheel so as to move responsive to port and starboard movements thereof, and having spaced port and starboard contacts, a switch alternately closing forward and reverse speed circuits through said motor, solenoids alternately energized to move said switch to close one or the other of said motor circuits, said port and starboard contacts being in the respective solenoid circuits, said control switch including a member mechanically connected to said armature shaft to move responsive to rotation of said armature shaft in either direction, and having a contact normally unconnected to an electrical source, positioned between said port and starboard contacts to be engaged by either to effect the energization of the corresponding solenoid, means for simultaneously declutching said clutch and connecting said intermediate contact to the electrical source, and a switch control for the operation of said motor alternative to said steering wheel control, comprising auxiliary circuits direct to said respective solenoids, in shunt relation to circuits through said control switch, and juxtaposed switches for closing said auxiliary circuits.

3. Dual mechanical and electrical steering system comprising a reversible electric motor including an armature shaft, a mechanical connection from said armature shaft to a rudder, a mechanical connection from said steering wheel to said armature shaft including a clutch, an electrical connection from said steering wheel to said motor including a control switch, the latter comprising a member mechanically connected to said steering wheel so as to move responsive to port and starboard movements thereof and having spaced port and starboard contacts in respective circuits which control the operation of the motor in forward and reverse directions, said control switch including a member mechanically connected to said armature shaft to move responsive to rotation of said armature shaft in either direction, and having a contact normally unconnected to an electrical source positioned between said port and starboard contacts to be engaged by either to effect the closure of corresponding motor circuits, means for simultaneously declutching said clutch and connecting the said intermediate contact to the electrical source, and a switch control for the operation of said motor alternative to said steering wheel control, comprising auxiliary circuits for effecting operation of said motor in either direction, in shunt relation to said control switch, and juxtaposed switches for closing said auxiliary circuits.

4. Dual mechanical and electrical system for operating a rudder, comprising a rudder, a motor having an armature shaft mechanically connected to said rudder for operating it, a steering wheel including a shaft fast thereto, and a member rotated by said steering wheel shaft through a clutch, said armature shaft being mechanically connected to said member to be driven mechanically by said steering wheel through said clutch, a switch comprising a pair of complementary rotary elements, one being mechanically connected to said member to be rotated thereby, said elment having a single contact electrically dead when said motor shaft is being operated mechanically, the complementary switch element being mechanically connected to said steering wheel shaft to be rotated thereby, having port and starboard contacts at opposite sides of said single contact arranged to make alternative engagement therewith, a circuit including an electrical source, said single contact, a solenoid for releasing said clutch, and a switch in said circuit for closing said circuit to energize said solenoid and said single contact, a reversing switch for said motor, and branch circuits respectively including solenoids for operating said reversing switch, said branch conduits respectively including said port and starboard contacts.

5. Dual mechanical and electrical system for operating a rudder, comprising a rudder, a motor having an armature shaft mechanically connected to said rudder for operating it, a steering wheel including a shaft fast thereto, and a member rotated by said steering wheel shaft through a clutch, said armature shaft being mechanically connected to said member to be driven mechanically by said steering wheel through said clutch, a switch comprising a pair of complementary rotary elements, one being mechanically connected to said member to be rotated thereby, said element having a single contact electrically dead when said motor shaft is being operated mechanically, the complementary switch element being mechanically connected to said steering wheel shaft to be rotated thereby having port and starboard contacts at opposite sides of said single contact arranged to make alternative engagement therewith, a circuit including an electrical source, said single contact, a solenoid for releasing said clutch, and a switch in said circuit for closing said circuit to energize said solenoid and said single contact, said port and starboard contacts being in circuit branches which respectively include instrumentalities for reversing the direction of rotation of the motor.

6. Dual mechanical and electrical system for operating a rudder as claimed in claim 5, including a slipping clutch in the mechanical connection between the steering wheel shaft and the switch element which carries the port and starboard contacts, whereby the steering wheel may be turned faster than the speed of rotation of said switch element that carries the single contact when said last named switch element is being operated by said motor shaft.

7. Dual mechanical and electrical system for operating a rudder as claimed in claim 4, including means for limiting the maximum permissible angular deflection of the rudder comprising normally closed limit switches in series circuit with the solenoids in said branch circuits, and means movable with said rudder engaging and opening one or the other of said limit switches at the corresponding limit angular position of the rudder.

MILTON L. LEVY.

REFERENCES CITED

The following references are of record in the file of this patent:

UNITED STATES PATENTS

| Number | Name | Date |
|---|---|---|
| 387,714 | Fiske | Aug. 14, 1888 |
| 1,472,257 | Titterington | Oct. 30, 1923 |
| 1,807,210 | Hinnekens | May 26, 1931 |
| 2,018,761 | Hodgman | Oct. 29, 1935 |
| 2,045,775 | Hodgman | June 30, 1936 |
| 2,333,980 | Branson | Nov. 9, 1943 |